United States Patent [19]

Graybill

[11] 4,167,770

[45] Sep. 11, 1979

[54] ISOLATING GAS BARRIER BETWEEN BUS AND ACCESSORY EQUIPMENT

[75] Inventor: Howard W. Graybill, Greensburg, Pa.

[73] Assignee: Gould Inc., Rolling Meadows, Ill.

[21] Appl. No.: 895,946

[22] Filed: Apr. 13, 1978

[51] Int. Cl.² ............................................ H02B 1/04
[52] U.S. Cl. ..................................... 361/378; 174/13; 361/341; 361/333
[58] Field of Search ............... 361/341, 335, 378, 332, 361/334, 333; 174/13, 14 R, 16 B, 22 C, 21 R, 21 C, 18, 99 B

[56] References Cited

U.S. PATENT DOCUMENTS

| | | | |
|---|---|---|---|
| 3,573,342 | 4/1971 | Graybill | 174/13 |
| 3,643,003 | 2/1972 | Graybill | 174/18 |
| 3,701,929 | 10/1972 | Taguchi | 361/378 |
| 3,819,845 | 6/1974 | Tahiliani | 174/28 |
| 4,038,486 | 7/1977 | Meyer | 174/13 |

Primary Examiner—Gerald P. Tolin
Attorney, Agent, or Firm—Ostrolenk, Faber, Gerb & Soffen

[57] ABSTRACT

Two axially spaced, fixed gas barriers are placed between gas-filled auxiliary equipment and the main gas-filled bus conductor of a gas-insulated electrical power substation. A short connection section is provided between the auxiliary equipment and main bus, and contains a first gas barrier support insulator. The second barrier insulator is fixed in the end of the auxiliary equipment. A filtered gas conduit extends around the first gas barrier and a further gas conduit extends from the filtered conduit into the housing of the second barrier insulator.

4 Claims, 6 Drawing Figures

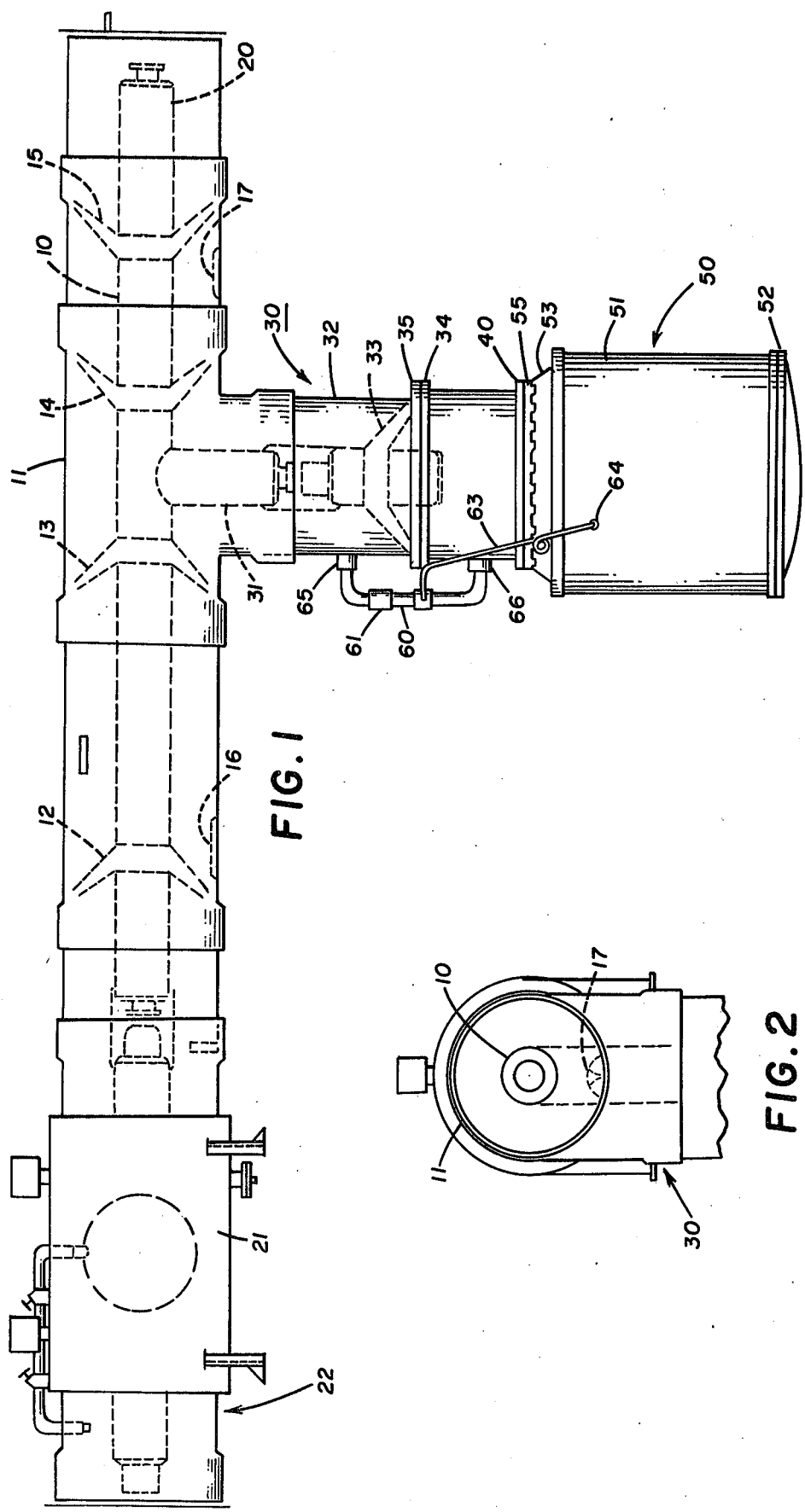

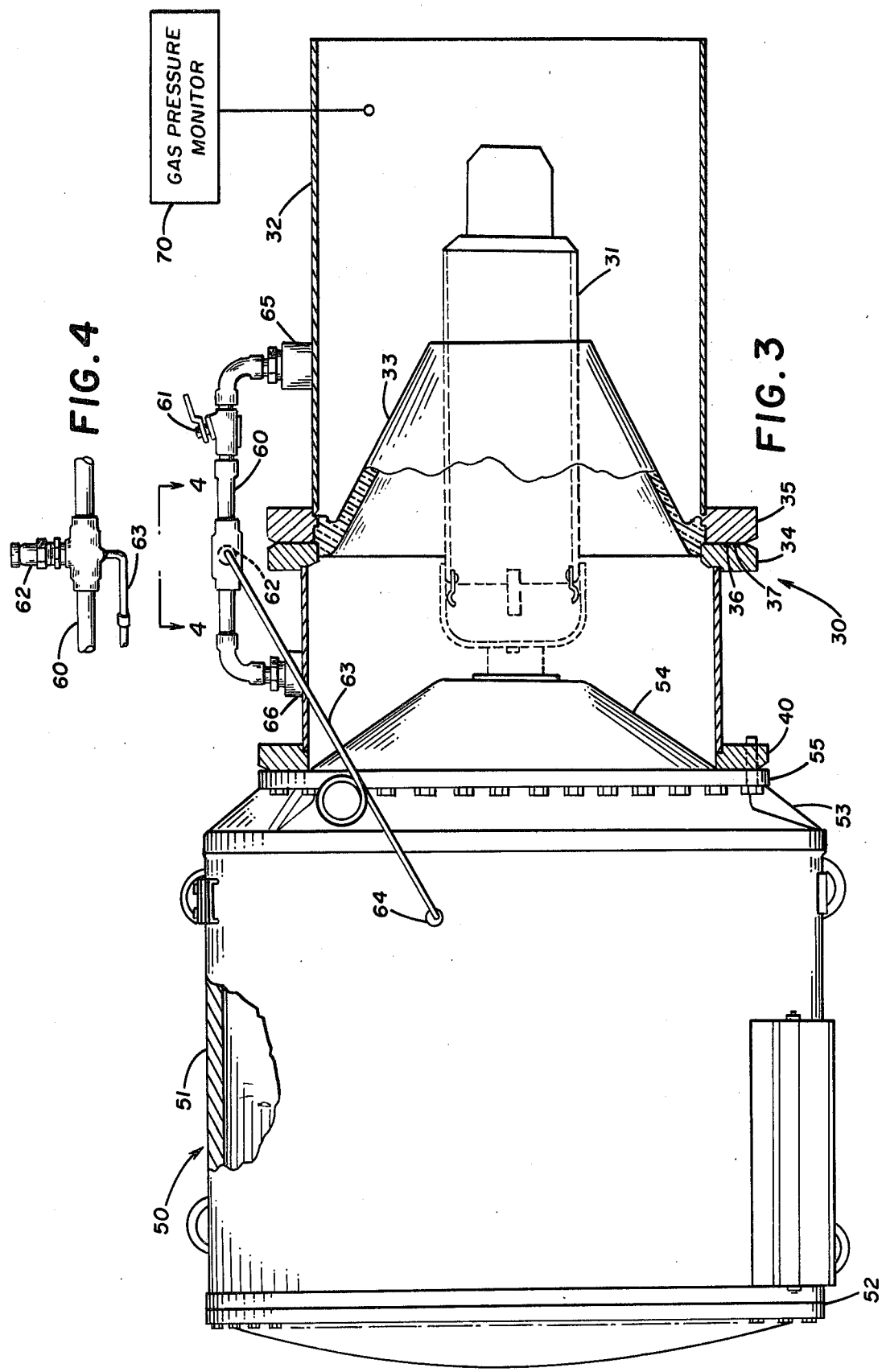

ISOLATING GAS BARRIER BETWEEN BUS AND ACCESSORY EQUIPMENT

BACKGROUND OF THE INVENTION

This invention relates to gas-insulated substations, and more particularly relates to a novel arrangement to prevent the contamination of the main bus if there is a failure of auxiliary gas-filled equipment connected to the main bus.

High voltage gas-insulated substations are well known in which bus conductors, disconnecting switches, circuit breakers and other components are enclosed in leak-tight, grounded metal enclosures, and energized parts are insulated from ground by means of compressed $SF_6$ gas. In such substations, buses are of concentric tubular construction as described, for example, in U.S. Pat. Nos. 3,573,341, 3,573,342 and 3,546,356.

In addition to circuit breakers and disconnecting switches, many gas-insulated substations require the addition of accessory equipment, such as surge arresters, potential transformers, capacitance voltage transformers and the like. These accessories are also mounted in grounded metal enclosures and surrounded by the compressed $SF_6$, as described, for example, in U.S. Pat. No. 3,624,450 and in copending application Ser. No. 758,635, filed Jan. 12, 1977, now U.S. Pat. No. 4,130,850, in the name of John C. Cronin et al, entitled HIGH SPEED FAULT DIVERTER SWITCH FOR GAS-INSULATED SYSTEMS, and assigned to the assignee of the present invention.

In gas-insulated substations now in service, these accessories are directly connected to the gas-insulated bus without any gas barrier between the accessory and the bus. Accessories such as arresters, coupling capacitors and potential transformers can and do occasionally fail; when they do, the amount of energy available in a high voltage station is sufficient to cause an internal explosion, involving high pressures and very high temperatures. If such failure occurred in an accessory directly connected to a main substation bus, metallic particles and gases and other debris could be driven into the bus. The failure would, of course, cause circuit breakers to open and de-energize the accessory and the bus but, with metallic vapor condensed on the insulator surfaces and metal particles in the main bus, it would be impossible to re-energize the bus until it had been thoroughly cleaned. The cleaning of the bus would require dismantling and re-assembly of the bus, which would typically require at least several days.

BRIEF DESCRIPTION OF THE INVENTION

In accordance with the invention, at least two gas barriers are provided in series between the bus and such accessories, to prevent any particles or debris from getting into the bus in the case of failure of an accessory, even if the first gas barrier is broken by the force of the internal explosion. A bypass conduit is also provided around the gas barriers to prevent the need for a separate monitoring system to monitor gas pressure in the accessory.

BRIEF DESCRIPTION OF THE DRAWINGS

FIG. 1 is a plan view of an assembly constructed in accordance with the present invention.

FIG. 2 is an end view of the right-hand end of FIG. 1.

FIG. 3 is a view of the short connection section of FIG. 1 with the housing partly broken away.

FIG. 4 is a view of the conduit of FIG. 3 as seen from section line 4—4 in FIG. 3.

DETAILED DESCRIPTION OF THE DRAWINGS

Figure 6:
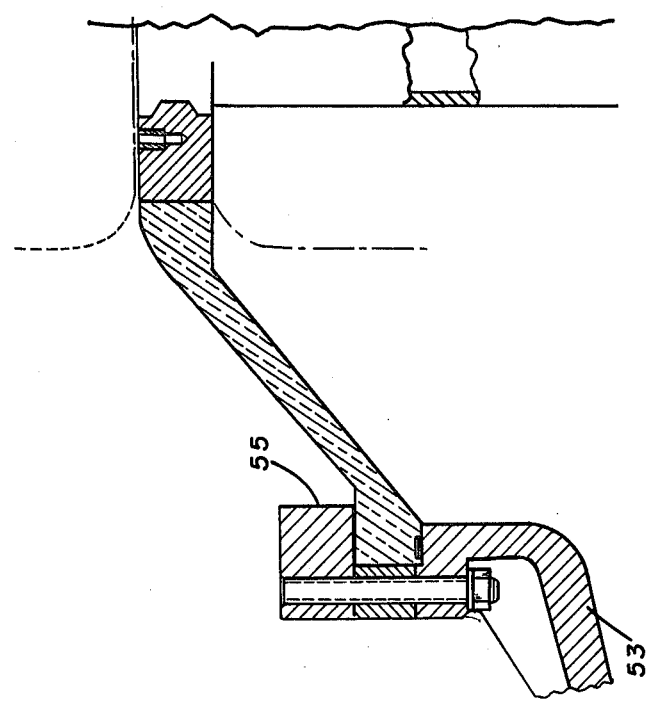
FIG. 6 is a section view of FIG. 5 taken across section line 6—6 in FIG. 5.

FIGS. 1 and 2 show a typical single-phase bus section in a substation where the bus section includes a central conductor 10 which is supported within an outer grounded housing 11. The entire substation may be of the type shown in copending application Ser. No. 758,635, now U.S. Pat. No. 4,130,850, referred to above. The conductor 10 is supported by conventional conical support insulators 12 to 15. If desired, contamination control traps 16 and 17 of the type shown in U.S. Pat. No. 4,034,147, dated July 5, 1977, in the name of Clark et al may be used inside the housing 11. The interior of housing 11 may be filled with sulfur hexafluoride gas at a pressure, for example, of 45 psig.

The right-hand end 20 of bus 10 is adapted for connection to another bus section or substation component while the left-hand end of bus 10 is connected to a gas-insulated disconnect switch 21. Disconnect switch 21 is, in turn, terminated by a short length of gas-insulated bus 22, adapted for connection to further bus sections or other substation components.

FIGS. 1 and 2 further show a short tee-shaped bus section 30 connected to the main bus. The tee section 30 consists of a central conductor 31 which is connected to main central conductor 10, and a short outer housing section 32. The central bus conductor 31 is supported within housing 32 by a gas barrier type conical support insulator 33.

FIG. 3 shows the manner in which gas barrier insulator 33 is supported within housing 32. Thus, housing 32 is formed of two housing sections which are terminated by heavy flanges 34 and 35, respectively. Suitable bolts clamp the flanges 34 and 35 together and compress O-ring seals 36 and 37 between the flanges to form a leak-proof seal.

The end of housing 32 is further provided with a heavy flange 40. Flange 40 is adapted for connection to an auxiliary substation component such as the gas-insulated potential transformer 50, shown in FIGS. 1, 3 and 5.

Figure 5:
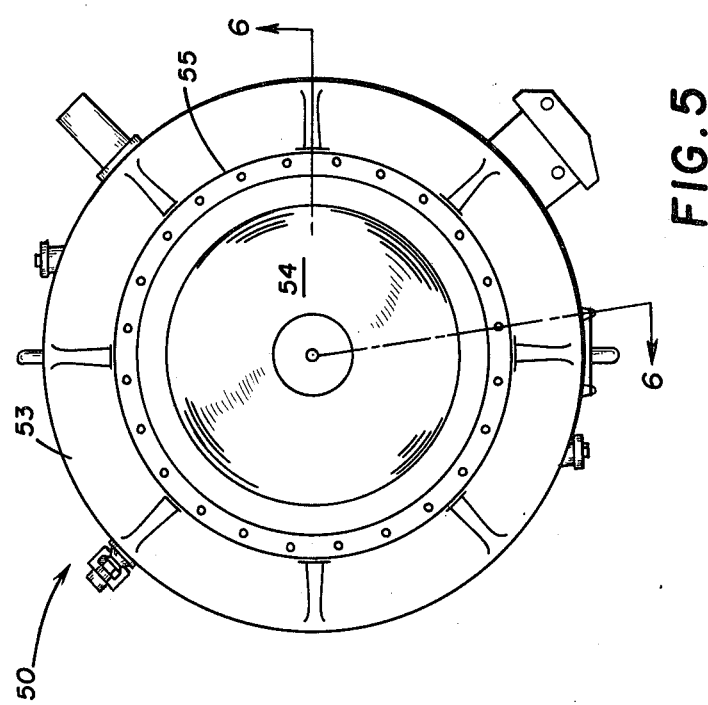
FIG. 5 is an end view of the auxiliary apparatus of FIG. 1.

Potential transformer 50 consists of an outer grounded housing 51 having a sealed bottom 52 (FIG. 1) and a cast end member 53 (FIGS. 1, 5 and 6). A second gas barrier insulator 54 is bolted against member 53 by bolt ring 55. Ring 55 is, in turn, bolted to flange 40 in FIG. 1.

The sealed interiors of each of housings 11, 32 and 51 are filled with sulfur hexafluoride gas at the same pressure. Thus, a gas conduit 60 extends around the gas barrier insulator 33 and contains a valve 61. As shown in FIG. 4, conduit 60 may also have an emergency evacuation and fill connection 62. A small diameter conduit 63 also extends from conduit 60 to a gas connection 64 in housing 51.

Fine screen filters 65 and 66 (FIG. 3) are provided at the points of connection of conduit 60 to housing 32. Filters 65 and 66 may be 40 to 60 micron filters.

In normal operation, the valve 61 is open, permitting pressure equalization between the main bus housing 11, the potential transformer housing 51, and the short bus housing section 32 between the two gas barrier insulators 33 and 54. Thus, all can be monitored with one gas pressure or gas density monitor 70. Moreover, if a small gas leak should develop in the potential transformer 50 or the short section of bus 32 between the two gas barriers 33 and 54, the large volume of the main bus would serve as a gas reservoir to keep gas pressure from falling rapidly in the leaking section.

If a failure should occur in the potential transformer 50, accompanied by a sharp increase in pressure due to the tremendous amount of heat generated by a power arc inside the transformer, and if the gas barrier insulator 54 should break, the larger volume would decrease the resulting pressure, and it is extremely unlikely that gas barrier 33 would break also. Any contaminated gas passing through the small diameter tubing 63 from the potential transformer into the bus sections would have sizable particles trapped by the fine screen filters 65 and 66, so particles could not pass into the bus sections 11 and 32. If such an event occurs, valve 61 can be closed and, by removing cap 62 (FIG. 4) and attaching a hose from a gas reclaiming trailer at this point, gas can be removed from the transformer 50 and the bus below barrier 33. The complete potential transformer can then be removed and replaced without lowering gas pressure in the main bus.

Note that the invention is not confined to connection of potential transformers to buses, but is equally applicable and desirable in connecting other accessories, such as gas-insulated coupling capacitor voltage transformers and surge arresters, to gas-insulated buses.

Although a preferred embodiment of this invention has been described, many variations and modifications will now be apparent to those skilled in the art, and it is therefore preferred that the instant invention be limited not by the specific disclosure herein but only by the appended claims.

I claim:

1. In a gas-insulated substation; an elongated gas-insulated bus comprising an elongated conductor at relatively high voltage extending coaxially within a coextensive dielectric gas-filled first housing at ground potential; said dielectric gas being at a pressure greater than atmospheric pressure; an electrical component disposed within a dielectric gas-filled second housing for connection to said elongated conductor; said second housing having a first gas barrier insulator extending across one end thereof; an intermediate connection assembly connecting said electrical component to said elongated conductor and comprising a short central conductor coaxially disposed within a short coextensive length of dielectric gas-filled grounded housing; and a second gas barrier insulator supporting said short central conductor within said short grounded housing; one end of said short grounded housing being connected to said first housing with their interiors in communication with one another; the other end of said short grounded housing being connected to said second housing and enclosing said first gas barrier insulator, whereby the interior of said short grounded housing is isolated from the interior of said second housing; said first and second gas barrier insulators being axially spaced from one another, whereby the interior of said second housing is isolated from the interior of said first housing by said first and said second barrier insulators; a first gas conduit means containing a valve means therein; said first gas conduit means extending between and communicating between the interior of said first housing and the interior of the volume of said short grounded housing contained between said first and second gas barrier insulators, whereby said volume of said short grounded housing communicates via said first gas conduit means with the interior of said first housing; a second gas conduit means extending between and communicating between said volume within said short grounded housing contained between said first and second gas barrier insulators and the interior of said second housing, whereby said volume of said short grounded housing communicates through said second gas conduit means with the interior of said second housing; and filter means connected in said first gas conduit means.

2. The apparatus of claim 1 wherein said first and second barrier insulators are conical insulators.

3. The apparatus of claim 1 wherein one end of said second conduit means is connected to said first gas conduit means.

4. The apparatus of claim 1 wherein said filter means includes first and second filter means connected to the first and second ends respectively of said first conduit means.